United States Patent
Ardebili poor

(10) Patent No.: US 9,970,363 B2
(45) Date of Patent: May 15, 2018

(54) AFTER-MARKET GASEOUS FUEL AND PETROL ENGINE CONVERSION SYSTEM

(71) Applicant: Jahangir Ahmadi Ardebili poor, Tehran (IR)

(72) Inventor: Jahangir Ahmadi Ardebili poor, Tehran (IR)

(*) Notice: Subject to any disclaimer, the term of this patent is extended or adjusted under 35 U.S.C. 154(b) by 0 days. days.

(21) Appl. No.: 14/452,435

(22) Filed: Aug. 5, 2014

(65) Prior Publication Data
US 2017/0356357 A1   Dec. 14, 2017

(51) Int. Cl.
| F02D 19/06 | (2006.01) |
| F02M 21/02 | (2006.01) |
| F02D 19/08 | (2006.01) |

(52) U.S. Cl.
CPC ........ *F02D 19/081* (2013.01); *F02D 19/066* (2013.01); *F02D 19/0607* (2013.01); *F02D 19/0615* (2013.01); *F02D 19/0642* (2013.01); *F02D 19/0647* (2013.01); *F02D 19/0678* (2013.01); *F02D 19/0684* (2013.01); *F02M 21/0212* (2013.01); *F02M 21/0278* (2013.01); *F02D 2200/10* (2013.01); *F02D 2200/602* (2013.01)

(58) Field of Classification Search
CPC .............. F02D 19/061; F02D 19/0615; F02D 19/0642; F02D 19/0647; F02D 19/066; F02D 2200/10; F02D 2200/1002; F02D 2200/602; F02M 21/0212; F02M 21/0215; F02M 21/0278
USPC ................................................ 123/525, 577
See application file for complete search history.

(56) References Cited

U.S. PATENT DOCUMENTS

| 4,450,822 | A | * | 5/1984 | Venning | F02M 13/08 123/525 |
| 5,150,685 | A | * | 9/1992 | Porter | F02B 69/00 123/478 |
| 5,450,832 | A | * | 9/1995 | Graf | F02M 13/08 123/515 |
| 5,713,336 | A | * | 2/1998 | King | F02B 43/00 123/525 |
| 5,816,224 | A | * | 10/1998 | Welsh | F02D 19/0647 123/525 |
| 6,145,494 | A | * | 11/2000 | Klopp | F02D 19/0631 123/406.32 |
| 6,588,406 | B2 | * | 7/2003 | Oprea | F02D 19/0647 123/304 |
| 7,546,834 | B1 | * | 6/2009 | Ulrey | F02D 19/0628 123/525 |
| 8,166,956 | B2 | * | 5/2012 | Ulrey | F02D 19/0628 123/525 |

(Continued)

*Primary Examiner* — Erick Solis
(74) *Attorney, Agent, or Firm* — Azadeh Saidi

(57) ABSTRACT

The invented system adds some petrol fuel to the vehicle engine which runs with natural gas (CNG or LPG). It causes a simultaneous combustion of petrol and natural gas (CNG or LPG). This action decreases depreciation of engine, increases power of the engine and reduces fuel consumption in natural gas vehicles. The above-mentioned system consists of an innovative petrol holder storage, an electronically circuit, a relay, a lever micro switch and a petrol fuel injector. Whenever the accelerator pedal is pressed more than a certain amount, the system will be activated and command to inject petrol collected in the storage into the air manifold.

7 Claims, 4 Drawing Sheets

(56) References Cited

U.S. PATENT DOCUMENTS

| | | | |
|---|---|---|---|
| 2004/0111210 A1* | 6/2004 | Davis | F02D 19/027 701/103 |
| 2012/0085322 A1* | 4/2012 | Trzmiel | F02B 43/00 123/470 |
| 2013/0220270 A1* | 8/2013 | Imai | F02D 41/266 123/294 |
| 2014/0060492 A1* | 3/2014 | Woolvett | F02D 19/06 123/478 |

* cited by examiner

AFTER-MARKET GASEOUS FUEL AND PETROL ENGINE CONVERSION SYSTEM

FIELD OF THE INVENTION

The present invention is planned to improve and modify fuel system in natural gas (CNG or LPG) vehicles. Specifically the above-mentioned system has been invented to inject extra petrol fuel to rectify some problems of fuel system in the current bi-fuel vehicle while the engine runs with natural gas (CNG or LPG). It's applicable on both vehicles with carburetor and fuel injection system.

BACKGROUND OF THE INVENTION

Natural gas not only is more economical than petrol and gasoline, but also produces less air pollution in comparison with mentioned fuels; therefore, researchers have more tendencies toward natural gas rather than the others. Using high efficiency engines that run with natural gas solely, necessitates designing more compatible natural gas burner engines. For two reasons, decision makers in automobile industries didn't show intention in manufacturing engines running with natural gas solely. First of all, natural gas is not able to produce power as strong as petrol or gasoline. Secondly, natural gas is not available all over the world.

Researchers, who didn't completely disappointed of usage of natural gas in automobile industry, advise people to convert their petrol fuel system vehicle to bi-fuel by applying some changes. Because of appropriate cost of natural gas, bi-fuel systems became prevalent in some countries but drivers of bi-fuel system vehicles usually complained of power of their automobile engine while their automobile runs with natural gas. They are being forced to switch to petrol fuel instead of natural gas in many cases like Uphill roads, pickup trucks loading and starting in low ambient temperature. Switching to petrol fuel was not desirable and it was averse the goal of bi-fuelling. Among the other deficiencies of bi-fuel system, depreciation of engine due to dryness of natural gas is worthy of mention which diminishes the engine life.

SUMMARY OF THE INVENTION

The aforesaid problems of previous systems are solved by installing the invented system on the fuel system of vehicle. By pressing on the accelerator pedal more than a certain amount, the system will be activated and some extra petrol inject to the engine that runs with natural gas. Combustion of natural gas and petrol simultaneously, increase the power of the engine dramatically so the vehicle can be derived on natural gas mode in Uphill roads even in mountainous roads, loaded heavily and started in any ambient conditions by pressing the accelerator pedal. As a result, the driver always becomes needless to switch to petrol mode when the engine runs in natural gas mode.

In traffic jam and downhill roads the driver doesn't press the accelerator pedal; thus the invented system doesn't inject any extra petrol fuel to the engine. In addition the injected petrol alleviates dryness of natural gas, thus deprecation of the engine stepped down and engine longevity will be increased.

According to results of test experiments on a Nissan Patrol, installation of the invented system reduces 50 percent of consumption of natural gas by injecting about 1 litter petrol per each 100 kilometers that obviously shows a noticeable deduction in consumption of natural gas. In addition needles of switching to petrol mode also little petrol used in this system causes a reduction in air pollution produced in comparison with bi-fuel vehicle and normal petrol vehicle.

DESCRIPTION OF DRAWINGS

FIG. 1 shows a bi-fuel vehicle which the invented system is installed to.

DETAILED DESCRIPTION OF THE INVENTION

Figure 1:
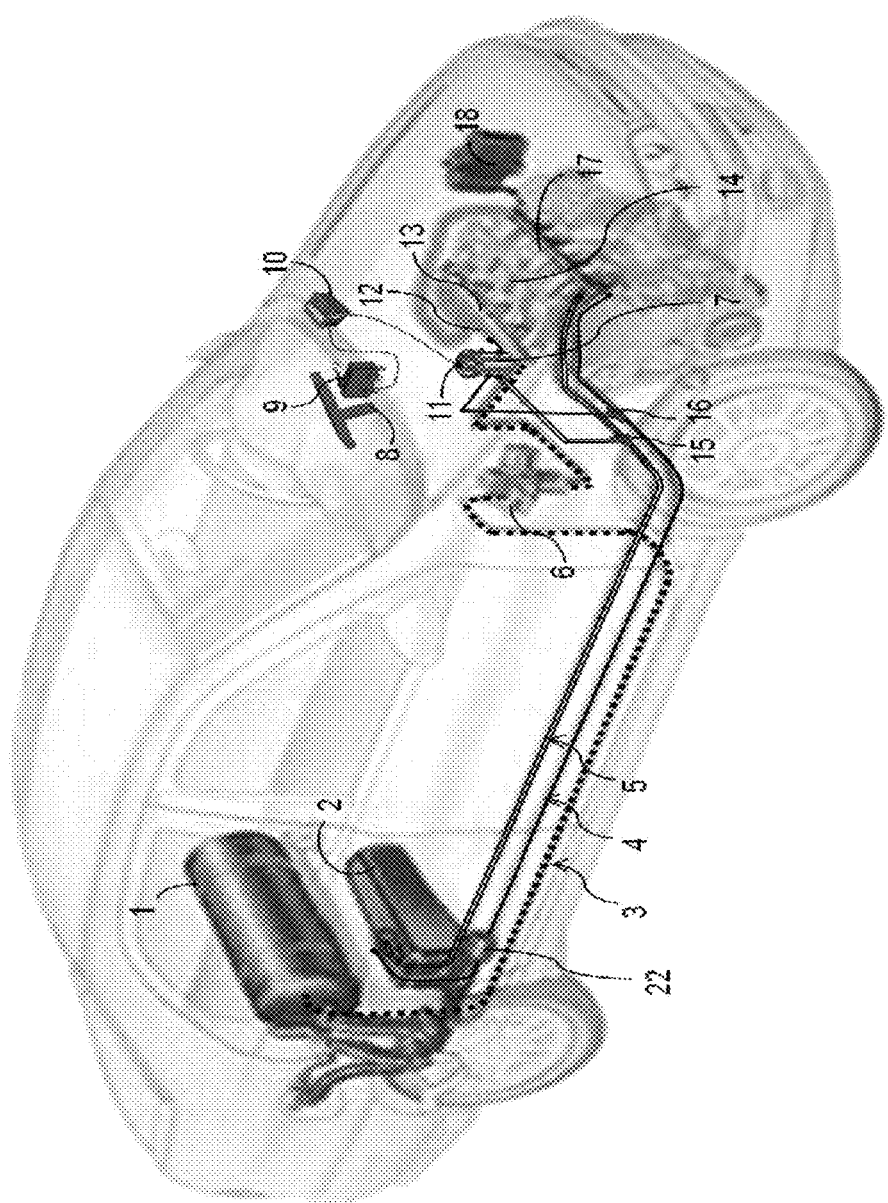

According to FIG. 1 showing a bi-fuel vehicle, in natural gas mode, natural gas is sent from gas tank 1 to pressure regulator 6 through a natural gas line 3 and then after adjusting the pressure of the gas it is transferred to a natural gas fuel rail and injectors 13 and then injected into engine 14 and is mixed with inlet air from manifold 12 to complete combustion process. On natural gas fuel system mode, petrol fuel rail and injectors 17 don't inject any petrol to engine 14 and therefore it solely runs by natural gas.

By applying hose connectors 15 and 16 and making branches from inlet petrol line 4 and outlet petrol line 5 respectively, installing lever micro switch 9 located under accelerator pedal 8, relay 10, injector 11 and petrol holder storage 7, fuel system of a bi-fuel vehicle will be improved and modified.

Figure 2:
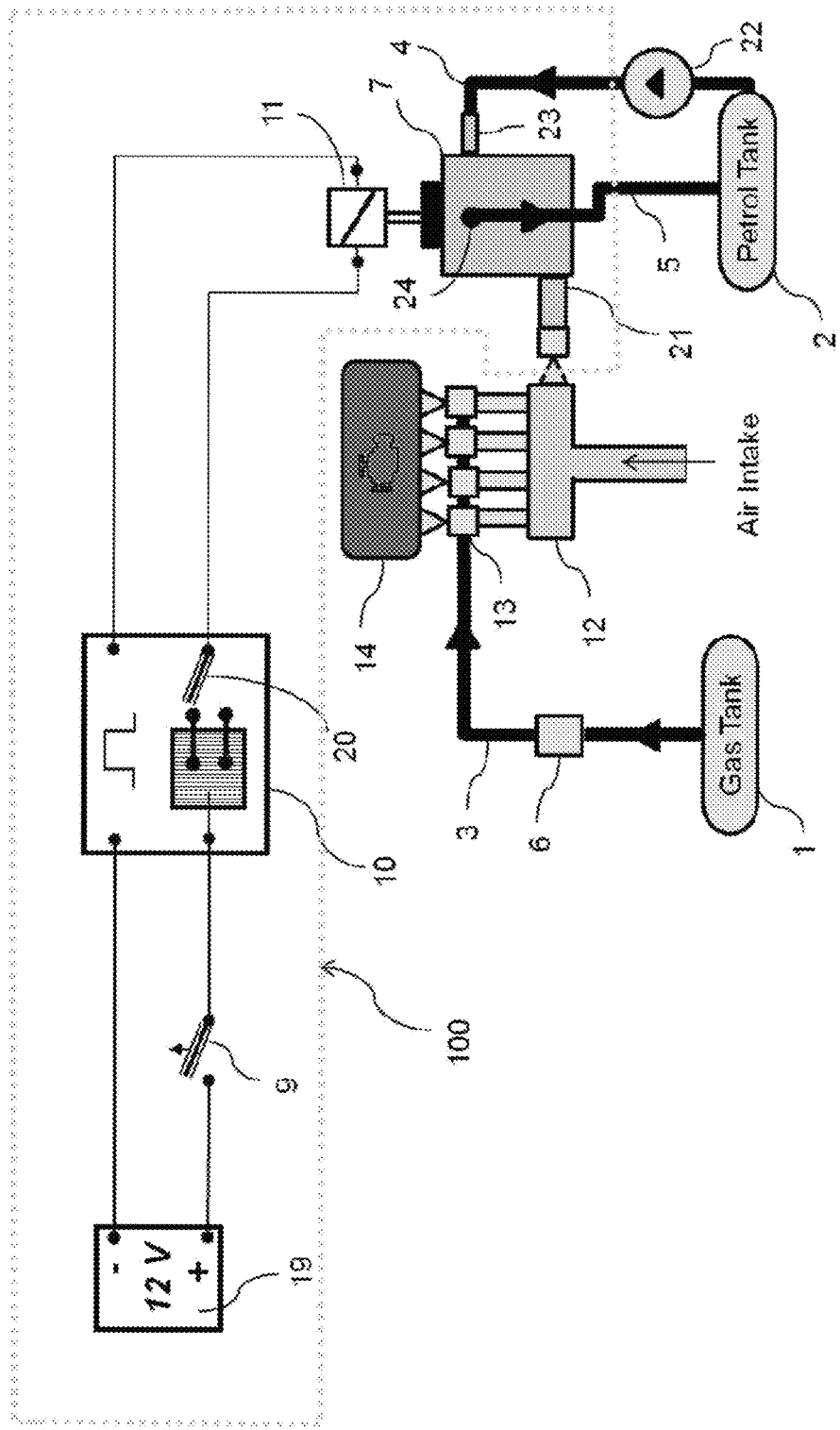
FIG. 2 is a schematic illustration of the components of invented system and their position in the fuel system of a bi-fuel vehicle.

According to FIG. 2 it could be described how the invented system functions. The invented system 100 is illustrated in FIG. 2. By pressing on the accelerator pedal 8 more than one third of its movement amplitude, the lever micro switch 9 located under accelerator pedal 8 is connected and the relay 10 is energized by electricity of battery 19. The relay then sends pulses with specific frequency to actuate an electrical valve that is an injector 11. Petrol is flowed from petrol tank 2 by pump 22 through petrol inlet line 4 to aluminum petrol holder storage 7 so that the storage is always full of petrol. Pulses that are transmitted from relay 10 to injector 11; cause opening and closing of the orifice of injector 11; therefore, petrol of the storage 7 is sprayed to air manifold 12 via 21 (that will be explained in FIG. 3).

On the other hand, natural gas is transferred to pressure regulator 6 from gas tank 1 through natural gas line 3. After adjusting the pressure it is sent to a fuel rail and injectors 13 and injected to engine 14 so the combustion is done in the engine with a mixture of air, petrol and natural gas. It is necessary to mention that the surplus petrol accumulated in petrol holder storage 7 is backed to petrol tank 2 via petrol outlet line 5.

A two-state switch 20 is designed on the relay 10. It is an on\off mode switch. On the off mode the invented system is isolated from vehicle fuel system. It should be said that the control system of extra injected petrol doesn't interfere with vehicle ECU (18 in the FIG. 1). It is a separate system that the driver can deactivated it any time.

Figure 3A:
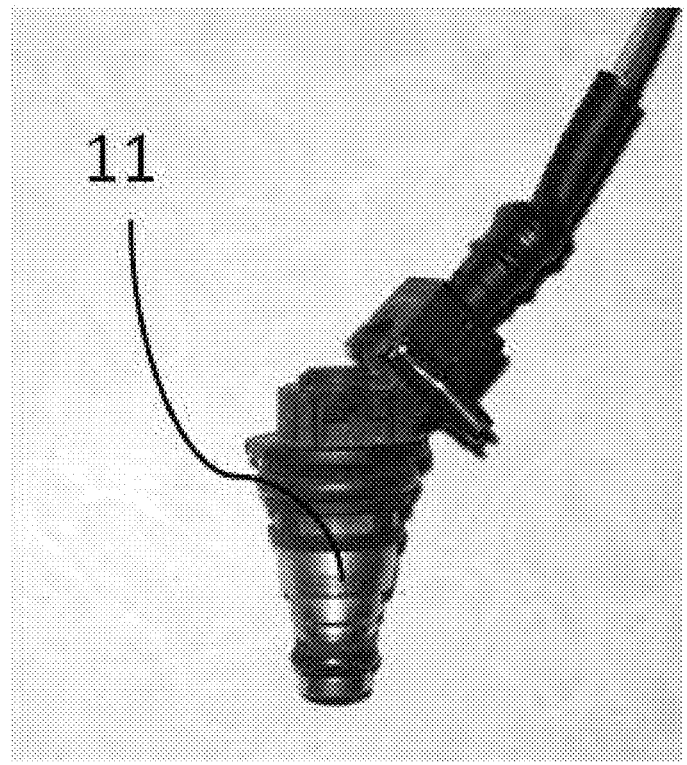
FIG. 3A is a photo of the injector of the invented system.
Figure 3B:
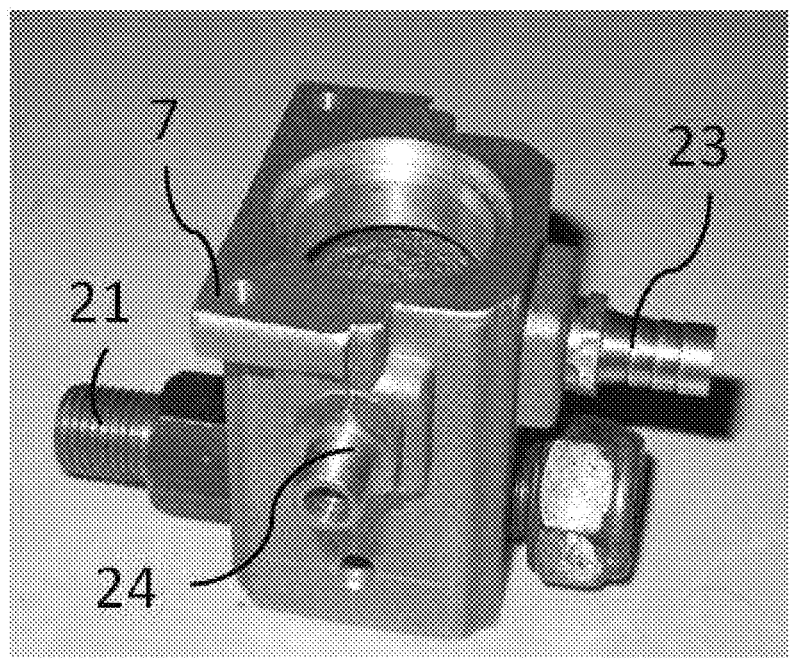
FIG. 3B is an isometric view of the petrol holder storage of invented system.
Figure 3C:
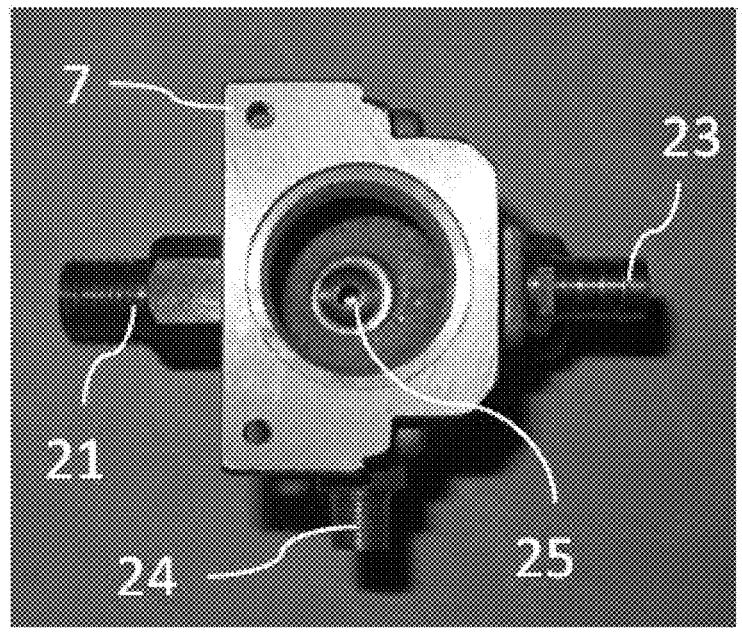
FIG. 3C shows a top view of the petrol holder storage of invented system.

FIG. 3B is a photo showing the above-mentioned aluminum petrol holder storage 7. Petrol enters in to the storage unit from input 23 and excess petrol is exited from output 24 and backed to petrol tank. Injector 11 that is shown in FIG. 3A is mounted on the top of the petrol holder storage 7. Petrol is injected from 11 to the orifice 25 in FIG. 3C that is concentric with the output of injector 11. Output 21 is the only escape for input 23 that is connected to air manifold so petrol is sprayed to air manifold (12 in FIG. 1 and FIG. 2).

Figure 4:
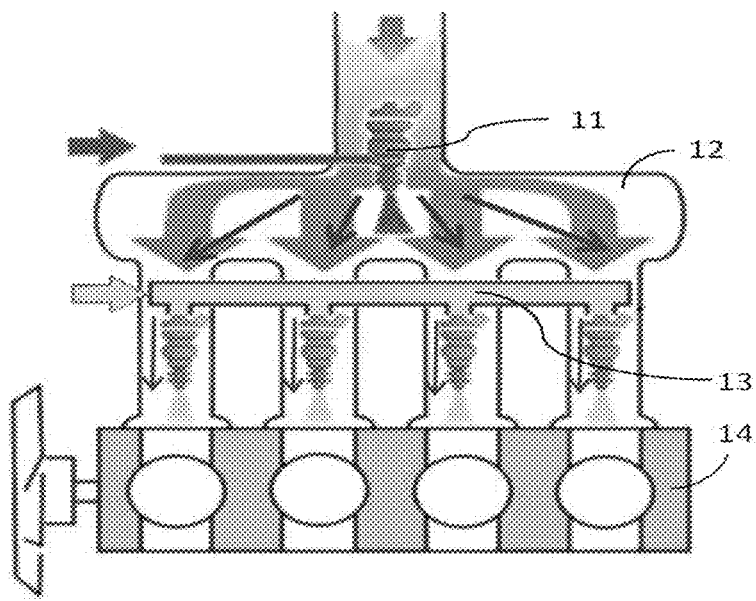
FIG. 4 indicates extension of the single point injector of the invented system to the multi-point injector of natural gas fuel system of the vehicle.

As seen in FIG. 4 displays a simultaneous use of single point injector and multi point injector in the fuel system of vehicles. Natural gas fuel is injected to engine 14 by natural gas fuel rail and multi point injectors 13 and petrol fuel is injected to engine 14 by the single point injector 11 connected to air manifold 12 so we have injection of petrol and natural gas at the same time. In FIG. 4 natural gas, inlet air and petrol respectively show with yellow, blue and red colors.

By pressing on the accelerator pedal more than a certain amount, the system will be activated and some extra petrol inject to the engine that runs with natural gas. Combustion of natural gas and petrol simultaneously, increase the power of the engine dramatically so the vehicle can be derived on natural gas mode in Uphill roads even in mountainous roads, loaded heavily and started in any ambient conditions by pressing the accelerator pedal. As a result, the driver always becomes needless to switch to petrol mode when the engine runs in natural gas mode.

In traffic jam and downhill roads the driver doesn't press the accelerator pedal; thus the invented system doesn't inject any extra petrol fuel to the engine. In addition the injected petrol alleviates dryness of natural gas, thus deprecation of the engine stepped down and engine longevity will be increased.

According to results of test experiments on a Nissan Patrol, installation of the invented system reduces 50 percent of consumption of natural gas by injecting about 1 litter petrol per each 100 kilometers that obviously shows a noticeable deduction in consumption of natural gas. In addition needles of switching to petrol mode also little petrol used in this system causes a reduction in air pollution produced in comparison with bi-fuel vehicle and normal petrol vehicle.

The invention claimed is:

1. A modified bi-fuel system for natural gas (CNG or LPG) and petroleum consuming vehicles comprising: a natural gas tank, a petroleum tank, pressure regulator, single point injectors and multipoint injectors; manifold; a micro switch located under an accelerator pedal;
    wherein said natural gas tank is connected to a pressure regulator through a natural gas line; and
    wherein natural gas is sent from said natural gas tank to said pressure regulator through said natural gas line, where pressure of said natural gas is adjusted and then is transferred to a natural gas fuel rail and to said multipoint injectors; said natural gas is then injected into an engine of said vehicle where it is mixed with inlet air from said manifold to complete combustion process;
    wherein when said modified system is activated by a driver and an on/off switch; said combustion process switches back and forth between an only natural gas system mode and a bi-fuel (natural gas and petrol) system mode by pressing or releasing said accelerator pedal; and
    wherein said modified system is switched to said bi-fuel mode when said accelerator pedal is pressed down to a specific level and therefore a relay located under said accelerator pedal is energized with a battery and therefore sends pulses with specific frequency to actuate an electrical valve of said single point injector: therefore allowing said petrol to flow from said petrol tank by a pump through a petrol inlet line to an aluminum petrol storage: keeping said petrol storage full at all times.

2. The system of claim 1, wherein when said modified system is operating on said natural gas fuel mode a petrol fuel rail and said multipoint injectors don't inject any of said petrol into said engine and therefore said combustion system runs only by said natural gas.

3. The system of claim 2, wherein in traffic jams and downhill roads said driver doesn't press said accelerator pedal; therefore said modified system doesn't inject any of said petrol fuel to said engine.

4. The system of claim 3, wherein said pulses open and close an orifice of said single point injector, therefore said petrol is sprayed into said manifold; while said natural gas is transferred to said pressure regulator from said gas tank through said natural gas line; after a pressure of said natural gas is adjusted it is sent to said natural gas fuel rail and said multipoint injectors; and then injected to said engine; therefore said combustion is done with a mixture of said petrol, air and said natural gas simultaneously.

5. The system of claim 4, wherein a surplus of said petrol accumulated in said petrol storage is backed to said petrol tank via a petrol outlet line.

6. The system of claim 5, wherein said relay comprises an on/off switch where in an off mode said modified system is deactivated and therefore said vehicle runs on only petrol; and said modified system is cut off and does not interfere with said vehicle's ECU; therefore said bi-fuel system is deactivated at any time by said driver using said on/off switch as needed; however when said modified system is activated said petrol is only injected in said system simultaneously with said natural gas when said accelerator pedal is pressed down to a specific level.

7. The system of claim 6, wherein combustion of said natural gas and said petrol simultaneously increases power of said engine dramatically; therefore in a bi-fuel mode said vehicle performs without any problems and with great speed and agility on uphill roads even in mountainous roads, or when loaded heavily; said injection of said petrol is performed automatically and when needed without said driver's manipulation of said vehicle.

* * * * *